Patented July 21, 1925.

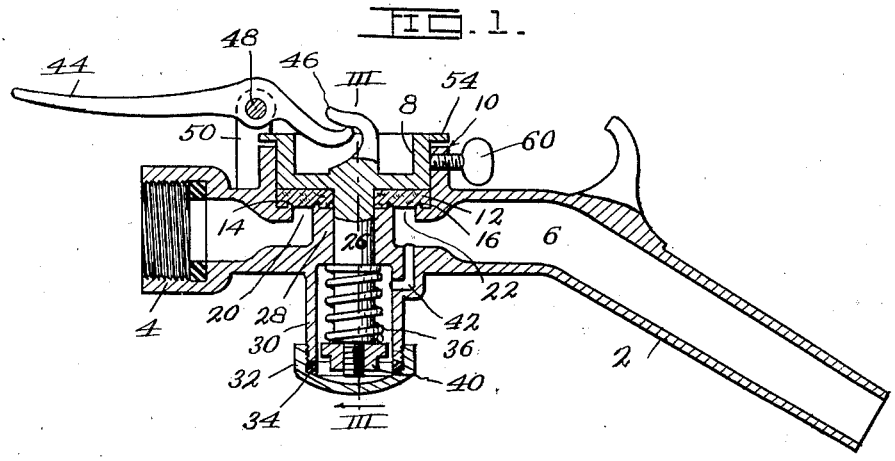
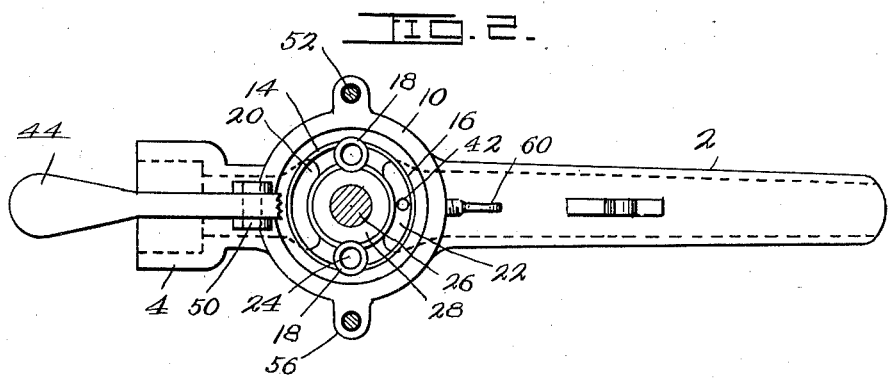
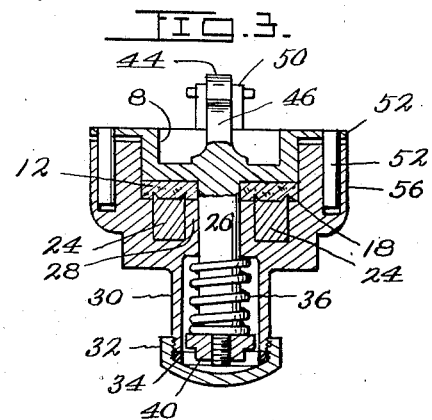

1,546,598

UNITED STATES PATENT OFFICE.

FRANK B. MILLER, OF KANSAS CITY, MISSOURI.

COMBINATION VALVE AND NOZZLE.

Application filed October 13, 1924. Serial No. 743,399.

*To all whom it may concern:*

Be it known that I, FRANK B. MILLER, a citizen of the United States, residing at Kansas City, in the county of Jackson and State of Missouri, have invented certain new and useful Improvements in Combination Valves and Nozzles, of which the following is a specification.

My invention relates to a combination valve and nozzle and one object is to provide a device of this character which may be employed to advantage on tank wagons, gasoline filling station hose, etc. A further object is to provide a device of this character which will present a large opening for the free flow therethrough of oil, gasoline, or other liquids, and when closed will effectually prevent leakage therefrom of any of such liquids.

In order that the invention may be fully understood, reference will now be had to the accompanying drawing, in which:

Fig. 1 is a longitudinal sectional view of the device.

Fig. 2 is a plan view of the device with the valve plug in section and the hand lever partly broken away.

Fig. 3 is a vertical cross section on line III—III of Fig. 1.

Referring now in detail to the different parts, 2 designates the nozzle which has a threaded rear end 4, so that it may be connected to a hose, pipe, or other conduit. The nozzle 2 is provided with a channel 6 for the passage therethrough of liquids, the flow of which is controlled by a cup-shaped valve plug 8, which is slidably mounted in an annular flange 10 projecting upwardly from the nozzle 2.

The plug 8 has affixed to its underside a disk 12 of cork or other flexible material adapted to fit upon segmental seats 14 and 16 and circular seats 18. The upper projecting margins of the seats 14, 16 and 18 are beveled as shown by Fig. 1, to readily become embedded in the disk 12 when the same is seated, and thereby seal segmental ports 20 and 22 formed between the seats 14 and 16, respectively, and communicating with the channel 6. The circular seats 18 are formed at the upper ends of plugs 24, which are interposed between the ports 20 and 22 to prevent the liquid flowing from the former to the latter when the valve is closed.

The valve plug 8 has a stem 26 which extends through a bearing 28 and into a tubular member 30. The bearing 28 is formed integral with the interior of the nozzle 2 and is provided at its upper margin with one of the seats 14 and 16 and cooperates with the plugs 24 in separating the port 20 from the port 22.

The tubular member 30 depends from the under side of the nozzle 2 to protect the lower portion of the valve stem 26 and is closed at its lower end by a nut 32. A gasket 34 is interposed between said tubular member 30 and said nut 32 to prevent leakage of any liquid that may enter the tubular member 30 through the bore of the bearing 28.

The valve plug 8 is normally held to its seat by a coil spring 36 loosely embracing the stem 26 and interposed between the upper end of the tubular member 30 and a nut 40 threaded upon the reduced lower end of said stem 26.

In order that the movements of the valve stem 26 and nut 40 may not be retarded by any liquid which may enter the tubular member 30 through the bore of the bearing 28, a duct 42 is provided so that a portion of said liquid may return to the channel 6 from the tubular member 30.

The valve is opened against the action of the spring 36 by a lever 44, the forward end of which engages a hook 46 projecting upwardly from the central portion of the plug 8. The lever 44 is mounted on a fulcrum 48 carried by lugs 50 on the upper rear portion of the nozzle 2, and said lever 44 is so formed that it may be operated with the same hand that directs the nozzle 2.

The plug 8 is held from rotating and carrying the hook 46 out of engagement with the lever 44 by pins 52 depending from a marginal flange 54 at the upper end of said plug 8, and operating in guides 56 formed at opposite sides of the nozzle 2.

60 designates a set screw threaded in the annular flange 10 for engagement with the upper portion of the valve plug 8, so that the same may be locked in either opened or closed position when desired.

With the parts constructed and arranged as shown and described it is apparent that the valve may be readily opened to permit the liquid to freely flow from the port 20 to the port 22 by depressing the rear end of the lever 44, and after the desired amount of liquid has been drawn off the valve will be closed by the spring 36 on release of the lever 44. As the valve closes the projecting beveled edges of the seats 14, 16 and 18 become embedded in the disk 12 and thus effectually seal communication between the ports 20 and 22.

Having thus described my invention, what I claim and desire to secure by Letters Patent, is:

1. In a device of the character described, a nozzle having a channel extending therethrough, a bearing extending upwardly into the nozzle between two ports of said channel, elements coacting with said bearing in separating the ports from each other, a self-closing valve slidably mounted in said bearing to close communication between the ports, and manually-controlled means for opening said valve.

2. In a device of the character described, a nozzle having a channel extending therethrough, a bearing extending upwardly into the nozzle between two ports of said channel and provided with upwardly projecting marginal valve seats, elements coacting with said bearing in separating the ports from each other and provided with upwardly projecting valve seats, a self-closing valve slidably mounted in said bearing and provided with a flexible member for engaging the projecting valve seats and closing communication between the ports, and a lever for opening said valve.

3. In a device of the character described, a nozzle having a channel extending therethrough, a bearing extending upwardly into the nozzle between two ports of said channel, elements coacting with said bearing in separating the ports from each other, a tubular member projecting from the nozzle, a valve slidably mounted in said bearing and extending into said tubular member, spring means arranged in said tubular member for normally holding the valve seated to close the ports, a hook on the upper end of said valve, and a hand lever engaging said hook to open the valve.

4. In a device of the character described, a nozzle having a channel extending therethrough, a bearing extending upwardly into the nozzle between two ports of said channel, elements coacting with said bearing in separating ports from each other, a tubular member projecting from the nozzle, a valve slidably mounted in said bearing and extending into said tubular member, spring means arranged in said tubular member for normally holding the valve seated to close the ports, a hook on the upper end of said valve, a hand lever engaging said hook to open the valve, guides on the nozzle, and pins operably mounted in said guides and fixed to the valve to prevent the same from rotating in the bearing.

5. In a device of the character described, a nozzle having a channel extending therethrough, a bearing extending upwardly into the nozzle between two ports of said channel, elements coacting with said bearing in separating the ports from each other, a self-closing valve slidably mounted in said bearing to close communication between the ports, manually-controlled means for opening said valve, and means threaded in the nozzle to engage the valve and secure the same in opened or closed position.

In testimony whereof I affix my signature, in the presence of two witnesses.

FRANK B. MILLER.

Witnesses:
L. J. FISCHER,
F. C. FISCHER.